May 21, 1940.  B. S. AIKMAN  2,201,571
BRAKE CYLINDER DEVICE
Filed Sept. 11, 1937  2 Sheets-Sheet 1

INVENTOR
BURTON S. AIKMAN
BY *Wm. M. Cady*
ATTORNEY

Patented May 21, 1940

2,201,571

UNITED STATES PATENT OFFICE 2,201,571

BRAKE CYLINDER DEVICE

Burton S. Aikman, Wilkinsburg, Pa., assignor to The Westinghouse Air Brake Company, Wilmerding, Pa., a corporation of Pennsylvania Application September 11, 1937, Serial No. 163,390

25 Claims. (Cl. 188—198)

This invention relates to fluid pressure brake equipment and more particularly to brake cylinder devices which form a part thereof and which are operative by fluid under pressure for effecting an application of brakes.

The usual brake cylinder device comprises a single acting piston slidably mounted in a cylinder body, and a push rod carried by the piston and slidably mounted in a non-pressure head secured to one end of the body. In order to prevent excessive wear of these parts of a brake cylinder device and maintain such parts in condition to work freely, and also to maintain the fit between the piston and cylinder as leak tight as possible, it is desirable to maintain these parts adequately lubricated, and one object of the invention is, therefore, to provide improved means which operate automatically to maintain the working parts of a brake cylinder device adequately lubricated while in service.

In order that the wear in the brake rigging or of the brake shoes on a vehicle will not materially increase the stroke of the brake cylinder piston required to move the brake shoes into braking engagement with the wheels of the vehicle, it is customary to associate with the brake cylinder device or with the rigging connecting the brake cylinder device to the brake shoes, one or more slack adjusters, and another object of my invention is to provide an improved slack adjuster for accomplishing this result.

Still another object of the invention is to provide an improved brake cylinder device having means which operate automatically to maintain the working parts adequately lubricated while the brake cylinder device is in service and which also acts automatically to compensate for brake shoe wear so as to maintain the brake applying stroke of the brake cylinder piston substantially constant during the life of the brake shoe.

Automatic slack adjusters are usually connected into the brake rigging at some point between the brake cylinder and the brake shoes, and in some cases the adjuster is secured to the brake cylinder itself, with the obvious result that they require space and therefore increase the difficulties in vehicle truck design and of brake installations in places which are often somewhat inadequate, and another object of the invention is therefore to provide an improved automatic slack adjuster adapted to obviate these difficulties.

A still further object of the invention is to provide an automatic slack adjuster within a brake cylinder device so as to simplify the problem of vehicle truck design and of brake installation and maintenance.

Still another object of the invention is to provide an improved automatic slack adjuster device adapted to be operated hydraulically.

Other objects and advantages will be apparent from the following more detailed description of the invention.

In the accompanying drawings.

Figure 1:
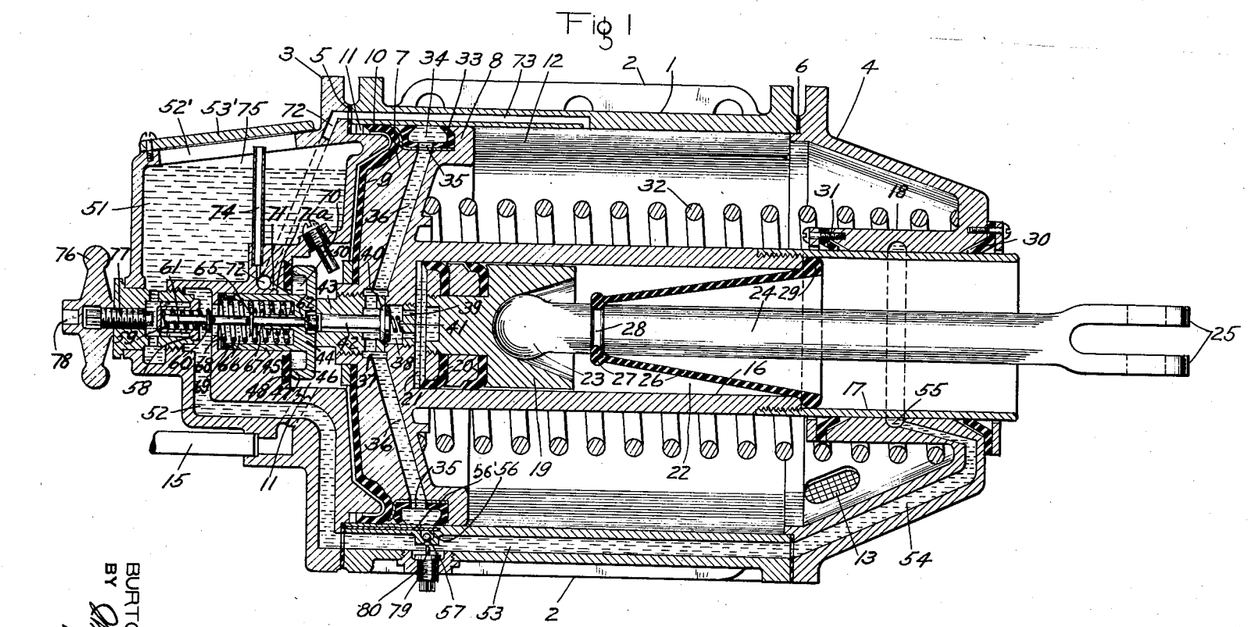
Fig. 1 is a sectional view of a brake cylinder device embodying one form of improved automatic lubricating system and slack take-up mechanism embodying the invention.

Referring to Fig. 1 of the drawings, the improved brake cylinder device shown therein comprises a brake cylinder body 1 having the usual mounting bracket 2 and provided with a through bore one end of which is closed by a pressure head 3, while a non-pressure head 4 is secured over the other end. A gasket 5 is interposed between the one end of the body and the pressure head 3, while a gasket 6 is interposed between the other end of said body and the non-pressure head 4 for preventing leakage through the joints formed between said heads and body.

A brake cylinder piston 7 is slidably mounted in the bore in the body 1 and comprises a piston head 8 and a packing cup 9 secured to the high pressure side of said head in any suitable manner. The packing cup 9 may be of usual construction provided with an annular, outwardly flaring skirt portion 10 which presses against the wall of the bore in the body 1 for preventing leakage of fluid from a pressure chamber 11 formed at one side of the piston to a non-pressure chamber 12 which is formed at the opposite side of said piston and which is open to the atmosphere through a breather hole 13 provided in the non-pressure head 4. The outer open end of the breather hole 13 is adapted to be closed by an air strainer of any suitable design.

The pressure chamber 11 is connected to a pipe 15 through which fluid under pressure is adapted to be supplied to said chamber for effecting movement of the piston 7 from the release position, shown in the drawings, in a direction toward the right hand for effecting an application of the brakes, and through which fluid under pressure is adapted to be released from said chamber for permitting movement of the piston in the opposite direction back to release position for effecting a release of brakes in the usual manner. As the piston is thus moved in the cylinder body 1, the non-pressure chamber 12 breathes through the strainer 14 which acts to prevent dust, cinders, and other foreign matter from entering said chamber upon movement toward the left hand, as will be evident.

The piston 7 is provided with a hollow piston rod formed in two connected parts 16, 17 projecting from the non-pressure side thereof. The non-pressure head 4 is provided centrally with an inwardly extending cylindrical piston rod guide portion 18 in which the piston rod 16, 17 is slidably mounted.

The portion 16 of the piston rod is preferably formed integral with the piston head 8 and is provided with an axial bore in which there is slidably mounted a slack take-up piston 19. The piston 19 is provided with a double packing, preferably in the form of two cups 20, in order to reduce to a minimum, possible leakage from a pressure chamber 21 formed at the left hand face thereof to a chamber 22 formed at the right hand face, the chamber 22 being at substantial atmospheric pressure at all times, as will be evident from the following description.

The portion 17 of the piston rod is preferably made of any suitable tubing the outside diameter of which is the same as that of portion 16 of said rod and said portions are secured together by screw threaded engagement. The diameter of the bore in the portion 17 of the rod is greater than that in the portion 16 in which the take-up piston 19 works.

The piston 19 is provided in its right hand or low pressure face with a socket having outwardly flaring sides in which the ball end 23 of a brake cylinder push rod 24, of usual construction, is disposed. The other end of the push rod 24 is provided with the usual jaw 25 adapted to be connected to a lever or the like in the brake rigging of a vehicle, and through the medium of this jaw the brakes on the vehicle are adapted to be applied upon movement of the brake cylinder piston 7 toward the right hand.

A frusto-conical shaped boot 26 is disposed in the chamber at the right hand side of the take-up piston around the push rod 24. This boot has an annular bead 27 at the small end which fits into an annular groove 28 in the push rod 24. An annular collar 29 is formed at the opposite, large end of the boot 26 and slidably engages the bore in the portion 17 of the piston rod. This boot is sufficiently rigid to move with rod 24 relative to the piston rod portion 17, as will be hereinafter described, and is provided for preventing dust, cinders, or other foreign matter which may enter the open end of the portion 17 of the piston rod from gaining access to the bore in which the slack take-up system 19 operates, and it is sufficiently rigid that the annular collar 29 will slide on the inner wall of the portion 17 of the piston rod as the slack take-up piston 19 moves relatively thereto, as will hereinafter be described.

The piston rod is preferably made in two sections, as above described, in order to reduce to a minimum the amount of machining required to form the bore in which the slack take-up piston 19 is disposed, and further, by making the portion 17 of said rod from relatively thin walled material an increase in lateral movement of the push rod 24 is permitted without said push rod striking against the end of the piston rod portion 17.

The outer diameter of the two portions 16 and 17 of the piston rod is the same so as to provide a smooth continuous bearing surface for movement through the guide portion 18 of the non-pressure head.

A packing cup 30 is secured to the outer end of the non-pressure head and is provided with an inwardly flared skirt portion which slidably engages the periphery of the portion 17 of the piston rod, while a packing cup 31, secured to the inner end of the piston rod guide 18, has an inwardly flared skirt portion which also slidably engages the periphery of the portion 17 of the piston rod. It will be noted that the skirt portions of the two packing cups 30 and 31 are flared in opposite directions and toward each other, so as to prevent leakage along the piston rod from between said cups.

A piston release spring 32 is provided in chamber 12 surrounding the piston rod 16, 17 and the piston rod guide 18 in the non-pressure head, one end of said spring engaging the low pressure face of the piston head 8 and the other end engaging the non-pressure head for urging the piston 7 in the direction toward the left hand for effecting a release of brakes, in the usual manner.

The piston head 8 is provided at its periphery with an annular groove back of the skirt portion 10 of the packing cup 9, and in this groove there is disposed an annular, substantially U-shaped packing 33, the outwardly extending leg portions of which flare toward each other and slidably engage the wall of the bore in the brake cylinder body 1. The space between the leg portions of the packing cup 33 forms a lubricant reservoir 34 the outer wall of which is formed by the cylinder body 1. This reservoir 34 is connected through a plurality of spaced openings 35 formed in the cup 33 to correspondingly spaced radial passages 36 formed in the piston head 8 and leading to an axial chamber 37 therein.

A chamber 38 is formed at one side of the chamber 37 and is open through a plurality of ports 39 to chamber 21 at the left hand face of the slack take-up piston 19. A check valve 40 is provided in chamber 38 for controlling communication therefrom to the chamber 37, and a spring 41 in the chamber 38 acts on said check valve for urging it to its seat to close this communication. The check valve 40 has a cylindrical stem 42 which extends through chamber 37 into an axial bore provided in a nut 43 disposed in the pressure chamber 11 and secured axially to piston head 8 by screw-threaded engagement.

The nut 43 normally engages one side of a lubricating pump piston 44 which is slidably mounted in the pressure head 3, and which comprises a central, cylindrical displacement portion 45 slidably mounted in a suitable bore provided in the non-pressure head 3, and a concentric head portion 46 disposed in chamber 11 and carried by the portion 45. The head portion 46 is of greater diameter than portion 45, and is provided around its outer edge with an annular seat rib 47 adapted to engage a gasket 48 for closing communication between chamber 11 and a chamber 50 thus formed within said rib.

The pressure head 3 is provided with a reservoir 51 having a filling opening 52' normally closed by a removable cover 53', and adapted to carry any fluid lubricant suitable for the lubrication of a brake cylinder. The pump piston 44 is provided for pumping lubricant from the reservoir 51 to a passage 52 in the pressure head 3 and from thence to a passage 53 extending through the brake cylinder body 1 and connected to a passage 54 in the non-pressure head 4 which leads to an annular groove 55 surrounding and open to the peripheral surface of the portion 17 of the brake cylinder piston rod.

The passage 53 in the brake cylinder body is also open through a chamber 56 in said body to the lubricant reservoir 34 in the U-shaped packing 33 carried by the piston head 8, when the brake cylinder piston 7 is in its release position, as shown in the drawings. A check valve 57 is provided in chamber 56 for closing communication from said chamber in the direction to passage 53 for reasons which will be hereinafter described. A pin 56' is provided in the brake cylinder device and extends through the chamber 56 to prevent the check valve 57 moving out of said chamber.

A check valve 58 is provided in the pressure head 3 for controlling communication between the lubricant reservoir 51 and the passage 52. This check valve is disposed in axial alignment with the pump piston 44 and is normally urged to its seat by a spring 59 one end of which engages said check valve and the other end of which engages a washer 60 secured to a rod 61 carried by the pump piston 44. The rod 61 slidably extends through a suitable bore in the pump piston 44 and at the right hand side thereof is provided with a valve 62 in axial alignment with the check valve stem 42 and sufficiently smaller in diameter than said stem to move into the bore in which it is disposed. A washer 65 is provided on the stem 61 in a chamber 66 formed within the cylindrical portion 45 of the pump piston 44, and interposed between said washer and piston is a spring 67 which acts to seat the valve 62.

A spring 68 contained in chamber 66 is interposed between a wall in the pressure head 3 and the pump piston head 46 for urging the pump piston 44 in a direction toward the right hand. A packing cup 69 is provided on the left hand end of the cylindrical portion 45 of the pump piston 44 and slidably engages the wall of the bore in which said piston is disposed for preventing leakage from chamber 66 past the cylindrical portion of the pump piston to chamber 50 and from thence to the pressure chamber 11 at the left hand face of the brake cylinder piston 7.

A stop pin 70 is disposed in the pressure head 3 in the line of movement of the pump piston head 46 for limiting the extent of movement thereof in a direction toward the right hand. This pin is preferably disposed at an angle, as shown in the drawings in order that it may be readily inserted through the reservoir opening 52 when the cover 53 is removed.

The chamber 50 at the left hand face of the pump piston head 46 is connected by a passage 71 to a passage 72 in the pressure head 3. Passage 72 leads to one end of a passage 73 in the brake cylinder body 1, the other end of passage 73 opening into the bore within said body a predetermined distance from the left hand end thereof. This distance is such that if the movement of the brake cylinder piston 7 is normal in effecting an application of the brakes, said piston will not move past the open, right hand end of passage 73, but if excessive, said piston will move to the right hand side of passage 73 and thus connect said passage to chamber 11 at the left hand side of said piston.

In the pressure head there is provided a pipe 74 the lower end of which is secured in said head and is open to passage 72, while the upper end is adapted at all times to extend above the level of lubricant in reservoir 51.

When the parts of the brake cylinder device are initially assembled, the bore in the brake cylinder body 1 in which the brake cylinder piston 7 operates, and that in the piston rod 16, in which the slack take-up piston 19 operates, and also that in the piston rod guide 18 in which the piston rod 16, 17 operates, will be lubricated by hand or otherwise, so that these parts will be in condition to operate as required, for a certain length of time after the brake cylinder device is applied to a vehicle in service. The slack-take-up piston 19 will also be in its extreme left hand position at the time the device is applied to a vehicle.

After the brake cylinder device is applied to a vehicle, the cover 53' over the lubricant reservoir 51 will be removed and said reservoir will be filled with any suitable fluid lubricant for use in lubricating the device while in service. The stand pipe 74 is sufficiently high to extend above the lubricant in reservoir 51 when filled. The cover 53' will then be reapplied to the pressure head 3, forming a leak proof joint to prevent leakage from the chamber 75 formed between said cover and the top of the lubricant in the reservoir 51.

In operation, when fluid under pressure is supplied to pipe 15, in order to effect an application of the brake, the pressure is transmitted to chamber 11 at the left hand face of the brake cylinder piston 7 and acts thereon to effect movement of said piston in a direction toward the right hand against the opposing pressure of the return spring 32.

The pressure of fluid thus obtained in chamber 11 also acts on the pump piston head 46 urging it into engagement with the gasket 48. If the movement of the brake cylinder piston 7 required to effect an application of the brakes is not excessive and therefore not sufficient to connect the passage 73 to the pressure chamber 11, the chamber 50 at the left hand face of the pump piston head 46 remains at atmospheric pressure which exists in the non-pressure chamber 12, and as a result, fluid pressure in chamber 11 maintains the piston head 46 in engagement with the gasket 48.

In order to effect a release of the brakes after an application, fluid under pressure is vented from pressure chamber 11 through the pipe 15 in the usual manner, which permits the return spring 32 to move the piston 7 back to its normal position, as shown in the drawings.

If, due to wear of the brake shoes or brake rigging, or for any other reason the piston 7 moves sufficiently in effecting an application of the brakes to connect passage 73 to the pressure chamber 11, then fluid under pressure flows from said chamber through said passage to passage 72 and from thence through pipe 74 to chamber 75 above the body of lubricant in reservoir 51, and also from passage 72 through passage 71 to chamber 50 at the left hand face of the pump piston head 46. This reduces the differential between the opposing fluid pressures acting on the pump piston head 46 sufficiently to permit the spring 68 to move the pump piston 44 towards the right hand away from the gasket 48.

As the pump piston 44 is thus moved it relieves the check valve 58 of the pressure of spring 59 and creates a suction at the right hand side of check valve which causes lubricant to flow from the reservoir 51 past said check valve to passage 52 and into chamber 66 at the left hand side of the cylindrical portion 45 of the pump piston. This suction or intake movement of the pump piston 44 is limited by engagement of the head 46 thereof with the stop pin 70 and the amount of charge of lubricant drawn past the check valve 58 consequently is limited to a predetermined degree determined by the displacement of the cylindrical portion 45 of said pump piston.

When fluid under pressure is vented from pressure chamber 11 in order to effect a release of the brakes, the brake cylinder piston 7 is returned towards the release position by the action of spring 32, as hereinbefore described. Just before the piston 7 reaches the release position however, the end of the nut 43 in the pressure face of said piston engages the pump piston 44 so that further movement of the brake cylinder piston toward release position returns the pump piston 44 to its normal position, as shown in the drawings.

The initial movement of the pump piston towards its normal position insures prompt seating of the check valve 58 in case said check valve has not been previously seated by spring 59, and then the lubricant in chamber 66 at the left hand side of the cylindrical portion 45 of said piston is forced out into passage 52 through which a portion of it flows to the annular groove 55 in the guide portion 18 of the non-pressure head thereby providing lubricant for the piston rod 16, 17.

Lubricant forced into passage 53 also flows past the check valve 57 to chamber 56 and from thence to the reservoir 34 in the annular packing, which reservoir is at this time in registry with said chamber. The lubricant thus supplied to chamber 34 is forced into contact with the brake cylinder wall and is adapted to be spread upon said wall upon subsequent movement of the brake cylinder piston 7 so as to provide a film of lubricant between said wall and the skirt portion 10 of packing cup 9.

When the brake cylinder device is initially placed in service, the passages 52 and 53, the annular groove 55 and the reservoir 34 may be empty, although if desired could be filled with lubricant at the time of assembling the device. The lubricant pump 44 has a relatively small displacement, so that if the passages of the lubricating system are empty, several strokes of the piston will be required to fill them before automatic lubrication is obtained for the working parts of the brake cylinder. This, however, is not undesirable since the lubricant manually applied to the working parts of the brake cylinder device at the time of assembling is adequate to provide satisfactory lubrication until the annular groove 55 and reservoir 34 become filled due to operation of the lubricant pump 44.

If desired, the lubricant passages 52 and 53, the groove 55, and reservoir 34 may be filled with lubricant immediately upon installing the device on a vehicle either by causing the brake cylinder piston to reciprocate as required to effect operation of the pump or by subjecting the lubricant in reservoir 51 to a fluid pressure and thereby forcing lubricant past the check valve 58 into passage 52 and from thence to the annular groove 55 around the piston rod 17 and to the reservoir 34 in the piston packing 33.

However this initial filling of the lubricating passages and reservoir in the brake cylinder device is obtained, any air therein will be forced into the annular groove 55 and into the reservoir 34 wherein it will rise above the lubricant and gradually leak past the respective packing cups until eventually all of the conduits will be freed of air and completely filled with lubricant, after which the operation of the lubricant pump piston 44 in effecting a release of brakes will act to merely replace the lubricant in the annular groove 55 and the reservoir 34 which has been used since the last operation of the pump piston.

After this replacement of lubricant is effected, the lubricant displaced by the pump piston during the remainder of its stroke builds up sufficient pressure on check valve 40 to unseat same against the pressure of spring 41, and lubricant then flows past said check valve to chamber 38 and from thence to chamber 21 at the left hand face of the slack take-up piston 19 and this effects a slight movement of the slack take-up piston outwardly of the piston rod section 16. The extent of this movement obviously is predetermined by the displacement of the cylindrical portion 45 of the pump piston after filling of the lubricating groove 55 and reservoir 34, and is intended to be sufficient to shorten the brake applying stroke of the brake cylinder piston 7 an amount to compensate for a slight increase in slack in the brake rigging due for instance to wear on the vehicle brake shoes.

After the slack take-up piston 19 is operated to take up slack in the brake rigging, the movement of the brake cylinder piston 7 upon the next application of the brakes will not be sufficient to open the passage 73 to the pressure chamber 11, so that the lubricant pump piston 44 will not be moved from its normal position shown in the drawings. However, when the slack in the brake rigging again becomes increased sufficiently to permit passage 73 to be connected to chamber 11 in effecting an application of the brakes, the pump piston 44 will again be caused to operate in the manner above described, to first force lubricant to groove 55 and reservoir 34, and then into chamber 21 at the left hand face of the slack take-up piston 19 for again effecting a certain limited movement of said piston outwardly relative to the brake cylinder piston 7. The piston 19 thus operates each time the slack in the brake rigging becomes sufficient to permit the brake cylinder piston to open passage 73 to the pressure chamber 11 and thereby maintains the stroke of the brake cylinder piston 7 required to effect an application of the brakes substantially constant.

As the slack take-up piston 19 is moved outwardly of the piston rod section 16 the boot 26 carried by the push rod 24 moves therewith, the outer end of the boot sliding along the inner wall of the piston rod section 17 and pushing ahead of it any dirt or foreign matter which may have accumulated on said wall, thereby preventing such foreign matter from getting on the wall engaged by the piston 19 and possibly causing leakage of lubricant from chamber 21 past said piston.

When the brakes are applied by operation of the piston 7 it will be evident that the pressure of the fluid acting in chamber 11 on said piston is transmitted through the body of lubricant between the check valve 40 and the left hand face of the take-up piston 19 to said piston and from thence to the piston rod 24, it being noted that the check valve 40 is normally seated so as to hold the lubricant in the take-up piston chamber 21.

When the pump piston 44 is operated to force lubricant to the annular groove 55 around the piston rod 16, 17 and to reservoir 34 within the U-shaped packing cup 33, it will be evident that the packing cups 30 and 31 act to prevent loss of lubricant from groove 55 along the piston rod, while the side walls of the packing cup 33 are forced by the pressure in reservoir 34 into tight sealing engagement with the wall of the bore in the cylinder body 1 so as to prevent leakage of lubricant from said reservoir, thereby limiting the amount of lubricant taken for the purpose of lubrication of the parts and consequently insuring an adequate amount to effect the proper take-up movement of piston 19.

When passage 73 is opened to pressure chamber 11 to permit the flow of fluid under pressure to chamber 50 at the left hand side of the pump piston 44, the same pressure is transmitted through the stand pipe 74 to chamber 75 on top of the lubricant in the reservoir 51. The lubricant in the reservoir 51 being thus placed under the same fluid pressure as that acting in chamber 11 prevents leakage of fluid from chamber 11 past the cylindrical portion 45 of the pump piston 44 to chamber 66 upon movement of the pump piston away from the gasket 48, this being desirable to prevent air leaking from chamber 11 past the cylindrical portion 45 of the pump piston 44 to chamber 61 and therein becoming mixed with the lubricant.

The packing cup 69 is provided on the left hand end of the cylindrical portion 45 of the pump piston in order to prevent leakage of lubricant from chamber 66 and passage 52 to chamber 11 while the lubricant pump is being moved to its normal position by the pressure of return spring 32 on the brake cylinder piston 7 upon return thereof to release position, at which time the lubricant acting on the left hand face of the pump piston will be at a higher pressure than the pressure of fluid in chamber 11 due to the relatively great force of the return spring 32 with respect to the small area of the cylindrical portion 45 of the pump piston 44.

After the passage 73 is opened to the nonpressure chamber 12 upon movement of the brake cylinder piston 7 toward release position, it will be noted that chamber 75 in the lubricant reservoir 51 will be opened to the atmosphere through the stand pipe 74 and passages 72 and 73, while, until the pump piston head 46 is moved into sealing engagement with gasket 48, the piston chamber 11 will be opened to the atmosphere by way of passages 71, 72, and 73 and thus permit the release of some fluid under pressure from the pressure chamber 11, but a choke 71a is provided in passage 71 to so restrict this release of fluid under pressure from chamber 11 that it will have no material influence on the release operation of the brake cylinder piston 7. However, this venting of passage 71 insures that chamber 50 at the left hand face of the pump piston 44 will be at atmospheric pressure when a subsequent application of the brakes is effected, so that the pump piston will not operate unless the brake cylinder piston moves past the passage 73.

The pressure of fluid in chamber 75 above the lubricant is preferably controlled through passage 73 as above described in order that the lubricant therein will be subject to substantially the same pressure as that in the groove 55 and reservoir 34, except in the occasional case of the brake cylinder piston 7 overtraveling the passage 73, so as to avoid undue dissipation of the lubricant from reservoir 51 in case there is any leakage at the packing cups 30, 31, or 33, and also, as a consequence, avoid over lubrication of the parts of the device.

The check valve 57 is disposed in the discharge line from the lubricant pump 44, so as to insure that said pump will obtain a full charge of lubricant from reservoir 51 upon its intake stroke. The check valve is, however, preferably located in the wall of the brake cylinder body 1 in order to avoid the possibility of leakage of fluid under pressure (compressed air) from the pressure chamber 11 to the passage 53 when the brake cylinder piston is moved to the right of chamber 57 in effecting an application of brakes. It is undesirable to permit air to enter the passage 53 and become mixed with the lubricant therein since due to its compressibility and the small displacement of the lubricant pump it would materially interfere with the lubrication of the parts and the operation of the slack adjuster piston 19. The check valve being located at the bottom of the cylinder seats by gravity and lubricant which will always be present in the chamber 56 will act to seal said check valve against leakage from chamber 11 to the passage 53, as will be evident.

As hereinbefore described, the outward movement of piston 19 relative to the brake cylinder piston 7 acts to increase the distance between the jaws 25 of the push rod 24 and said brake cylinder piston and this increase in length, in effect, of the piston rod compensates for any increase in slack in the brake rigging due to wear of brake shoes, so as to maintain the stroke of the brake cylinder piston 7 substantially constant throughout the life of the brake shoes. When the brake shoes on the vehicle become worn to an extent which requires renewal, the slack take-up piston 19 will be disposed in the piston rod 16 considerably to the right of the position shown in the drawings, and it is then, of course, necessary to reset or move the slack adjusted piston 19 back to its original left hand position in order to apply new brake shoes with the proper clearance between them and the vehicle wheels.

In order to reset the piston 19 at the time of applying new brake shoes, it is necessary to unseat the check valves 40, 57, and 58 in order to permit lubricant to flow or be forced from the chamber at the left hand face of the adjuster piston 19 back into the reservoir 51.

In order to unseat these check valves a wrench 76 is provided which is normally carried on a screw 77 provided in the pressure head 3 in axial alignment with the check valve 58. This wrench is unscrewed from the screw 77 and then turned end for end and the socket 78 in the opposite end is applied to the squared end of the screw 77 following which, the wrench is operated to turn said screw into engagement with the check valve 58. Further turning of the wrench 76 and screw 77 then pushes the check valve 58 off of its seat, during which movement said check valve picks up the rod 61 and then moves the valve 62 on the right hand end thereof toward the brake cylinder piston 7. As the rod 61 and valve 62 are thus moved the valve enters the bore in which the check valve stem 42 is disposed and engages said stem, and then acts through said stem to push the check valve 40 away from its seat.

After the check valves 58 and 40 are thus unseated, the wrench 78 is removed from the screw 77 and the socket portion 78 thereof is applied to the head of a screw 79 disposed beneath the check valve 57. The screw 79 is then turned by the wrench so that a small axial pin extension 80 on the inner end thereof enters the opening below the check valve 57 and then engages and unseats said check valve.

Communication is thus established from chamber 21 at the left hand face of the take-up piston 19 to the lubricant reservoir 51. The piston 19 is then moved towards the left hand in the portion 16 of the piston rod to substantially the position shown in the drawings as required to provide the proper shoe clearance for the new shoes. During this movement of piston 19, which may be effected by pressure applied to the jaws 25 or any other suitable part of the brake rigging the lubricant in chamber 21 is forced past the check valves 40, 57, and 58 back into the lubricant reservoir 51.

After the adjuster piston 19 is thus returned to the normal position for applying new brake shoes then, by means of the wrench 76 the screw 79 is returned to its original position for permitting check valve 57 to seat and the screw 77 is backed out to its normal position to permit the check valves 40 and 58 to seat. The wrench 76 is then screwed on to the screw 77 into engagement with the pressure head 3 in which condition it is carried until it is necessary to again apply new brake shoes.

From the above description of the improved brake cylinder device it will be evident that lubricant is supplied to the working parts of the brake cylinder only at such intervals as required to insure adequate lubrication of the working parts, the occurrence of lubricant feed being coincident with the wear of brake shoes which causes operation of the slack adjuster piston 19 to reduce the stroke of the brake cylinder piston 8.

Figure 2:
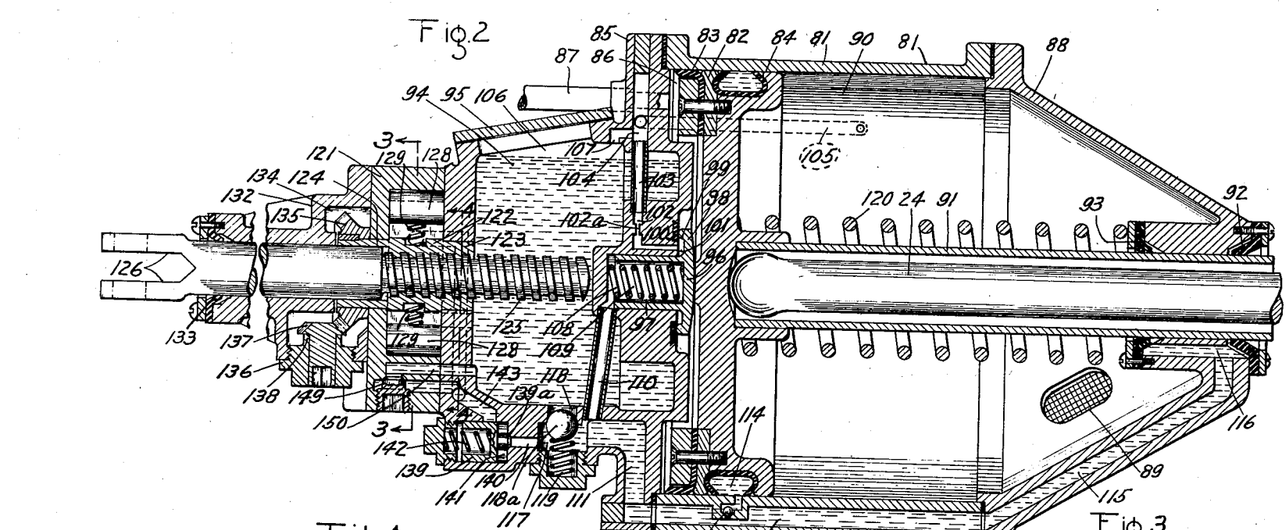
Fig. 2 is a view similar to Fig. 1 and embodying another form of improved lubricating system and slack take-up mechanism.

Referring now to the modified construction shown in Fig. 2 of the drawings, this construction is similar to that shown in Fig. 1 and above described, in that it embodies a lubricating system which operates in substantially the same manner and it also embodies an automatic slack adjuster which, however, is of somewhat different construction than that shown in Fig. 1 but which is controlled by the lubricating pump.

The brake cylinder device shown in Fig. 2 comprises a cylinder body 81 containing a piston 82 which is provided with a packing cup 83 and a substantially U-shaped lubricant carrying cup 84. A pressure head 85 is secured to the body 81 and cooperates with the piston 82 to form a pressure chamber 86 which is open to a pipe 87 through which fluid under pressure is adapted to be supplied to and released from said chamber for controlling the operation of the piston 82. A non-pressure head 88 is secured to the opposite end of the body 81 and is provided with a breather opening 89 through which a non-pressure chamber 90 formed at the right hand side of the piston 82 is connected to the atmosphere.

The piston 82 has a hollow piston rod 91 which is slidably mounted in a suitable bore in an inwardly extending cylindrical portion of the non-pressure head 88, and disposed within said hollow rod is the usual brake cylinder push rod 24. A packing cup 92 is secured to the outer end of the non-pressure head and has a skirt portion slidably engaging the periphery of the piston rod 91, while a packing cup 93 is secured to the inner end of the inwardly extending cylindrical portion of the non-pressure head and has a skirt portion slidably engaging the periphery of the piston rod 91; these packing cups acting in the same capacity as the packing cups 30 and 31 in the construction shown in Fig. 1.

The pressure head 85 is provided with a lubricant reservoir 94 having a filling opening closed by a cover 95. A lubricant pump 96 is provided which comprises a cylindrical piston portion 97 slidably mounted in a bore provided in the pressure head 85 axially of the brake cylinder piston 82, and a piston head 98 carried by the portion 97 and disposed in the pressure chamber 86. The piston head 98 is provided around the periphery with a bead 99 adapted to seal against a gasket 100 provided in the pressure head 85 for thereby forming within said bead a chamber 101 which is adapted to be connected through a passage 102, a pipe 103 and a passage 104 in the pressure head to a passage 105 in the cylinder body 81, the passage 105 being open at its right hand end to the non-pressure chamber 90, a predetermined distance from said pressure head. A chamber 106 formed above the body of lubricant in reservoir 94 is open through a passage 107 to the passage 104.

A spring 108 is provided within the cylindrical portion 97 of the pump piston 96 and acts on said piston urging same in a direction towards the right hand. A chamber 109 at the left hand side of the piston 96 is connected through a pipe 110 to a lubricant conveying passage 111 in the pressure head, and said passage is connected to a passage 112 in the cylinder body. The passage 112 is connected past a check valve 113 to a lubricant reservoir 114 formed between the side walls of the annular cup 84 on the brake cylinder piston 82 and is also connected to a passage 115 in the non-pressure head 88, the passage 115 leading to a passage 116 which is open at one end to the peripheral surface of the piston rod 91 at the pressure side of the packing cup 92 and at the opposite end is open to the peripheral surface of said piston rod at the pressure side of the cup 93.

The passage 111 is adapted to be connected to the bottom of the lubricant reservoir 94 then a chamber 117 and a passage 118. A check valve 118a is provided in chamber 117 for preventing flow of lubricant in the direction from said chamber to the reservoir 94, and a spring 119 contained in chamber 117 acts on said check valve urging it to its seated position shown in the drawings.

The construction and operation of this brake cylinder device and automatic lubricating system thereof, as so far described, is substantially the same as that of the device disclosed in Fig. 1 of the drawings in that lubricant is only supplied to the working parts of the device in case of excessive travel of the brake cylinder piston 82, in effecting an application of the brakes due for instance to wear of brake shoes.

In operation, if in effecting an application of the brakes, due to the supply of fluid under pressure through pipe 87 to pressure chamber 86, the brake cylinder piston 82 moves to the right sufficiently far to open the right hand end of passage 105 to said pressure chamber, fluid under pressure is then supplied to said passage and from thence through passages 104 and 107 to chamber 106 in the reservoir 94 and also from passage 104 through pipe 103 and passage 102 to chamber 101 at the left hand face of the pump piston head 98. The differential of fluid pressures is thereby reduced on the pump piston head 98 to a degree sufficient for the spring 108 to move said pump piston in a direction towards the right hand away from gasket 100.

As the cylindrical portion 97 of the pump piston is thus moved, lubricant is drawn from the reservoir 94, past the check valve 118a into chamber 117 and thence through pipe 110 into chamber 109 filling the space created by movement of said portion of the pump piston. It will be noted that there is no stop or other means for limiting the movement of the pump piston 96 on its intake stroke in the direction towards the right hand, however, the spring 108 is so designed that after a predetermined movement of said piston said spring will cease to exert pressure thereon, thereby limiting its stroke.

When fluid under pressure is released from the pressure chamber 86 through pipe 87 in order to effect a release of the brakes after an application, and the brake cylinder piston 82 is returned toward the release position by the return spring 120, said piston engages the lubricant pump piston 96 before the release position is obtained, so that the remaining movement moves the pump piston towards the left hand, and thereby forces lubricant out of the chamber 109 down through the pipe 110 into passage 111 and from thence into passage 112 in the cylinder body 81. From passage 112 lubricant is forced past the check valve 113 into the reservoir 114 in packing cup 84 and also into passage 115 in the non-pressure head 88 and from thence into passage 116 from whence lubricant is forced into contact with the periphery of the piston rod 91 at the pressure side of the packing cups 92 and 93. These packing cups act to prevent leakage of lubricant along the piston rod 91, while the side walls of the packing cup 84 in the brake cylinder piston prevent leakage of lubricant out of the reservoir 114.

After the reservoir 114 in the brake cylinder piston 82 and the communication for carrying lubricant to said reservoir and to the piston rod 91 in the non-pressure head 88 are initially filled with lubricant, only a small portion of the pumping stroke of the pump piston 96 is required to replace the lubricant used therefrom since last filled; the lubricant displaced by the remainder of the stroke of the pump piston being then employed for operating an automatic slack adjuster device, to be hereinafter described.

When in releasing the brakes the brake cylinder piston 82 is returned to its full release position shown in the drawings, the piston head 98 is again moved into sealing engagement with the gasket 100, and passage 105 is opened to the non-pressure chamber 95, so that chamber 101 at the left hand face of the pump piston 96 is then opened to the atmosphere, as well as chamber 106 above the lubricant in the reservoir 94, so that the pump piston 96 will not be operated again until the brake shoes have become worn sufficiently to permit the piston 82 to again overtravel the right hand end of the passage 105.

The check valves 113, 118a, and a choke or restriction 102a in the passage 102 act in the same capacity in this structure as the corresponding check valves 57 and 58 and choke 71a in the construction shown in Fig. 1.

An automatic slack adjuster device is associated with the brake cylinder device shown in Fig. 2. It is, however, not incorporated within the brake cylinder as is that in the construction shown in Fig. 1, but instead is carried by the pressure head thereof.

This automatic slack adjuster device comprises a casing 121 secured to the non-pressure head 85 and having a cylindrical chamber preferably concentric to the brake cylinder piston 82. One end wall of this chamber is formed by the end of the non-pressure head 85, and disposed in said chamber in concentric relation therewith is a rotor 122 having rubbing contact with the end walls thereof, but which is of somewhat smaller diameter than that of said chamber.

The rotor 122 is provided on one end with a bearing 123 which is journaled in a suitable opening provided in the end wall of the pressure head 85 and is provided on the other end with a bearing 124 journaled in a suitable opening through the end wall of the casing 121.

The rotor 122 is provided axially with a screw-threaded bore in which there is disposed a slack adjuster screw 125 the inner end of which is adapted into the lubricant reservoir 94. The outer end of the slack adjuster screw 125 is provided with a yoke 126 adapted to be connected to a lever or the like in the brake rigging of a vehicle and said yoke acts in the operation of the device to hold the screw 125 against turning.

The rotor 122 is provided with four equally spaced radial slots 127 in each of which there is slidably disposed a vane preferably in the form of a roller 128 of substantially the same length as the rotor. A spring 129 is disposed in each of the chambers 127 back of the respective rollers 128 for urging the rollers outwardly into contact with the inner cylindrical wall of the rotor chamber. At the high pressure side of each roller 128 a slot 130 is provided in the rotor 122 connecting chamber 127 at the back of the rotor to the space between the rotor and its cylinder for permitting equalization of pressures on the rotor for reasons which will be hereinafter described.

Two oppositely spaced shoes 131 are secured to the casing 121 in the space between the rotor and casing. These shoes are adapted to have rubbing contact with the periphery of the rotor and the two ends of each shoe are tapered for raising and lowering the rollers 130, as will be hereinafter described.

A casing section 132 is secured to a casing section 121 and provides an outer bearing for the slack adjuster screw 125. A packing cup 133 is secured to the end of the casing section 132 and bears against the periphery of the adjusting screw 125 for preventing leakage of lubricant through this end bearing.

The casing section 132 has a chamber 134 in which there is disposed a bevel gear 135 which is keyed to the extended portion of the rotor bearing 124. The chamber 134 is open at its lower end, the opening being closed by a bearing element 136 having screw-threaded engagement therewith and carrying a pinion 137 disposed in said chamber and having driving engagement with the bevel gear 135. The pinion 137 is carried by a shoulder 138 on the element 136 and is adapted to have sealing contact therewith so as to prevent leakage of lubricant out of chamber 134.

A valve piston 139 is slidably mounted in the non-pressure head 85 and has on one end a valve 139a of smaller diameter for controlling communication from a passage 140 leading to check valve chamber 117, to a chamber 141 at one side of the valve piston 139. A spring 142 is provided to act on the opposite side of the valve piston 139 for urging the valve 139a to its seat.

In operation, after the lubricating piston 96 has been moved sufficiently on its pumping stroke to fill the lubricating passages and reservoir 114 in the brake cylinder device with lubricant, a sufficient pressure is built up on the lubricant in passage 140 acting on the valve 139a to overcome the opposing pressure of the spring 142 and unseat said valve, whereupon lubricant displaced by further movement of the pump piston flows into the chamber 141 and acts over the greater area of the valve piston 139, which is thereby promptly shifted toward the left hand connecting chamber 141 to a passage 143 into which lubricant displaced by the remainder of the stroke of piston 96 is forced.

Figure 3:
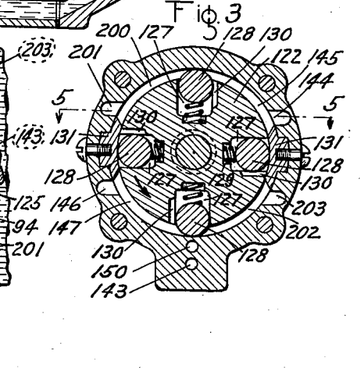
Figs. 3 and 4 are sectional views taken on the lines 3—3 and 4—4 in Fig. 2.
Figure 4:
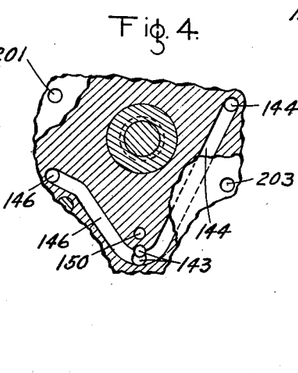
Figure 5:
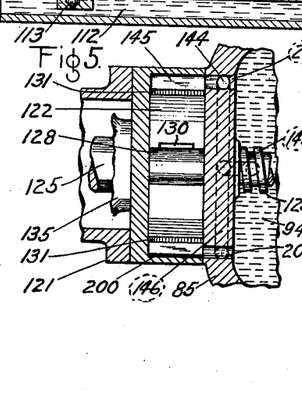
Fig. 5 is a sectional view taken on the line 5—5 of Fig. 3.
Figure 6:
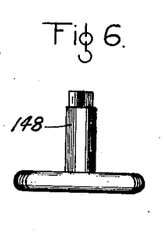
Fig. 6 is a side elevation of a wrench for use in connection with the brake cylinder device shown in Fig. 2.

Lubricant under pressure thus supplied to passage 143 flows therefrom in one direction through a passage 144 to a chamber 145 between one of the fixed shoes 131 and the topmost rotor roller 128 as viewed in Fig. 3 of the drawings, and in the opposite direction through a passage 146 to a diametrically opposite chamber 147 between the other bearing shoe 131 and the lowermost rotor roller 128, as viewed in Fig. 3 of the drawings. The opposite side of the topmost rotor roller 128 is at this time subject to substantially atmospheric pressure in a chamber 200 which is connected through a passage 201 to the lubricant reservoir 94, the chamber 106 above the lubricant therein being connected through passages 107, 104, and 105 to the non-pressure chamber 90 at the right hand side of the brake cylinder piston 82. The lowermost roller is likewise subject in a chamber 202 to substantially atmospheric pressure at this time since chamber 202 is connected through a passage 203 to the lubricant reservoir 94. As a consequence, the pressure of lubricant supplied to the chambers 145 and 147 and acting on the opposite sides of the two diametrically opposite rollers 128 acts to turn the rotor 122 on the screw 125 in a direction indicated by the arrow shown on Fig. 3 of the drawings, and thus force the screw 125 outwardly of the brake cylinder toward the left hand.

This movement of the screw increases the distance between the jaw 26 and the brake cylinder piston 82, when in release position, the result of which is that a shorter stroke of said piston is required to move the brake shoes on the vehicle into braking engagement with the wheels thereof upon a succeeding application of the brakes.

Whenever the slack in the brake rigging again becomes increased, due to shoe wear or the like, sufficiently for the brake cylinder piston to again connect passage 105 to the pressure chamber 86, the rotor 122 of the slack adjuster device will be again rotated on the screw 125 to compensate for such wear, and in this manner the slack adjuster will continue to operate throughout the life of brake shoes to maintain the brake applying stroke of the brake cylinder piston 82 substantially constant.

The displacement of the lubricant pump piston 96 is such that the amount of lubricant discharged thereby for effecting operation of the slack adjuster device will cause only a small degree of rotation of rotor 122 and consequently will only take up a small increment of slack per operation of the device, so that the variation in stroke of the brake cylinder piston between two successive operations of the slack adjuster device will be so small as not to materially interfere with the control of brakes.

After a slight turning of the rotor 122 from the position shown in the drawings, the two vanes or rollers 128 shown engaging the shoes 131 will move out of engagement therewith, the springs 129 forcing same into engagement with the rotor cylinder wall.

The inlet passages 144 and 146 are of greater width than the bearing surface of the rollers 128, as clearly shown in Fig. 3 of the drawings, so that after said rollers move into engagement with the rotor cylinder wall and then pass over said ports, said ports never become closed by the rollers, but said rollers become subject on both sides to the pressure of lubricant supplied through the inlet passages. These rollers thus remain subject on both sides to this lubricant pressure and the rollers ahead continue to act to turn the rotor 122 as required, until the rollers ahead pass over the respective discharge passages 201 and 203 and thereby reduce the pressure of lubricant on the leading face of each of the following rollers after which they become effective to turn the rotor.

To be more specific, lubricant under pressure supplied to chambers 145 and 147 acts on the topmost and lowermost rollers 128, as viewed in Fig. 3 of the drawings, to effect rotation of rotor 122 until these rollers move over their respective discharge passages 201 and 203, after which the trailing rollers become subject to the opposing pressures of lubricant in the supply and discharge passages for effecting further rotation of the rotor 123 as required. The shoes 131 have a sufficiently close fit with the rotor to prevent leakage of lubricant under pressure supplied to effect operation of the rotor to the discharge passages 201 and 203.

After the brake shoes on a vehicle become worn to an extent where it is necessary to replace them with new shoes, it will be evident that the slack adjusted screw 125 will be disposed in a position considerably to the left of that shown in the drawings and it will therefore be necessary at the time of replacement to return said screw to its initial position, as shown in the drawings, in order to provide the proper clearance between the new shoes and the vehicle wheels.

In order to return the screw 125 to its initial position, a wrench 148 is provided. This wrench is adapted to be applied to a socket in the stem of a valve 149 and then operated to back said valve away from its seat to thereby connect the lubricant supply passage 143 in the slack adjuster to a passage 150 which leads to the lubricant reservoir.

After the valve 149 is unseated, the wrench 148 is removed therefrom and applied to a socket in the end of the stem of the pinion gear 137 which is then operated to turn the gear 135 and thereby the rotor 122 in a direction opposite to that indicated by the arrow shown in Fig. 3. During this rotation of rotor 122, the rollers 128 act to draw lubricant from the reservoir 94 and discharge same into passage 143. But since passage 143 is open to the reservoir 94 through passage 150, the lubricant merely flows through the adjuster device and does not interfere with the readjustment of the screw 125.

After the slack adjusted screw 125 is thus returned to its initial position the wrench 148 is removed from the stem of the bevel gear 137 and again applied to the stem of the valve 149 which is screwed into engagement with its seat, following which the mechanism is again able to operate to automatically take up slack as the new brake shoes wear away, in the manner above described.

In the slack adjuster device lubricant may leak to some slight degree from the reservoir 94 along the adjusting screw 125 and past the rotor 122 and its bearings 123 and 124 into the chamber 134 and may tend to leak from said chamber along the adjuster screw and out at the end of the casing section 132. Such leakage is, however, reduced to a negligible degree by the use of the packing cup 133 engaging the periphery of the slack adjuster screw 125 and by the sealing engagement between the pinion 137 and the shoulder 138.

The valve piston 139 and valve 139a are provided to prevent any flow of lubricant to the slack adjuster rotor 122 until after a sufficient pressure has been developed on the lubricant in the lubricant conveying conduit 111 in the brake cylinder device as to insure adequate lubrication of the working parts of said device.

From the above description of the several embodiments of the invention it will be evident that improved means have been provided for automatically maintaining the working parts of a brake cylinder device adequately lubricated while in service so as to provide for the most efficient operation thereof, and associated with the pressure lubricating system of these embodiments are improved automatic slack adjuster devices adapted to be operated hydraulically by lubricant from the brake cylinder lubricating system to compensate for wear of the brake shoes and other parts of the brake rigging, so that the stroke of the brake cylinder piston in effecting an application of the brakes will not exceed a desired degree.

While several embodiments of the invention have been described in detail it is not the intention to limit the scope to these embodiments or otherwise than by the terms of the appended claims.

Having now described my invention, what I claim as new and desire to secure by Letters Patent, is:

1. A brake cylinder device comprising in combination, a cylinder, a pressure head secured to one end of said cylinder, a non-pressure head secured to the opposite end of said cylinder, a brake cylinder piston slidably mounted in said cylinder, a rod carried by said piston and slidably mounted in a bore through said non-pressure head, a reservoir in said pressure head containing a quantity of lubricant, a pump piston slidably mounted in said pressure head and operable to supply lubricant from said reservoir through an intake passage to a chamber and from said chamber through a discharge passage for lubricating said device, a check valve for preventing back flow through said intake passage, a check valve for preventing back flow through said discharge passage, and means for effecting operation of said pump piston upon movement of said brake cylinder piston from release position and the subsequent movement of said brake cylinder piston back to release position.

2. A brake cylinder device comprising in combination, a casing, a brake cylinder piston slidably mounted in said casing, pump means operative to force lubricant to the moving parts of said device for effecting lubrication thereof, and means controlled by movement of said piston for rendering said pump means effective upon a certain predetermined movement of said brake cylinder piston in said casing and ineffective if the movement of said brake cylinder piston is less than said predetermined movement.

3. A brake cylinder device comprising in combination, a casing, a brake cylinder piston slidably mounted in said casing, a source of lubricant, pump means controlled by opposing fluid pressures and operative upon substantial equalization thereof to effect a supply of lubricant from said source to a chamber, said piston being operative after a predetermined movement in one direction to effect said equalization of fluid pressures and upon movement in the opposite direction to effect operation of said pump means to force lubricant from said chamber to the moving parts of said device for effecting lubrication thereof, said piston being inoperative to effect said substantial equalization of fluid pressures on said pump means upon movement less than said predetermined movement.

4. A brake cylinder device comprising in combination, a casing, a brake cylinder piston slidably mounted in said casing and having at one side a chamber vented to the atmosphere and at the opposite side a pressure chamber to which fluid under pressure is adapted to be supplied to effect movement of said piston in the direction to effect an application of brakes and from which fluid under pressure is adapted to be released to permit movement of said piston in the opposite direction to effect a release of the brakes, a source of lubricant, pump means comprising a displacement portion operative to effect a supply of lubricant from said source to a lubricant distributing chamber and from said chamber to the moving parts of said device for effecting lubrication thereof, resilient means for operating said displacement portion to supply lubricant to said lubricant distributing chamber, said brake cylinder piston being operative upon the release of fluid under pressure from said pressure chamber to effect operation of said displacement portion to force lubricant from said lubricant distributing chamber, said pump means further comprising piston means subject on one face to the pressure of fluid in said pressure chamber and having at the opposite side a control chamber, said piston means being operative when said control chamber is vented to prevent operation of said displacement portion by said resilient means and to permit such operation when fluid under pressure is supplied to said control chamber, said brake cylinder piston being operative only after a predetermined extent of movement in the direction to effect an application of the brakes to supply fluid under pressure to said control chamber.

5. A brake cylinder device comprising in combination, a casing, a piston slidably mounted in said casing and having at one side a non-pressure chamber and at the opposite side a pressure chamber to which fluid under pressure is adapted to be supplied for effecting movement of said piston in one direction to effect an application of brakes and from which fluid under pressure is adapted to be vented to permit movement of said piston in the opposite direction to effect a release of brakes, a source of lubricant adapted to be subjected to the pressure of fluid in said pressure chamber, a lubricating pump comprising a spring, piston means adapted to be operated by said spring to effect a supply of lubricant from said source to a chamber and adapted to be operated by said brake cylinder piston to force lubricant from said chamber to the moving parts of said device to effect lubrication thereof, differential control means for said lubricating pump subject on one side to the pressure of fluid in said pressure chamber acting in opposition to the pressure of lubricant on said piston means, and subject on the opposite side to the pressure of fluid in a control chamber, said differential control means being operative to prevent operation of said piston means by said spring when said control chamber is vented, said brake cylinder piston being operative to vent said control chamber at all times when the movement of said brake cylinder piston in effecting an application of the brakes in less than a predetermined degree and to supply fluid under pressure from said pressure chamber thereto and to the lubricant in said source when the movement of the brake cylinder piston in effecting an application of the brakes exceeds said predetermined degree.

6. In combination, a brake cylinder piston operative upon movement to effect an application of brakes, means movable by liquid to reduce the stroke of said piston required to apply the brakes, mechanism operative to force liquid to said means to effect the operation of said means, and means operative when the stroke of said piston exceeds a predetermined degree to effect the operation of said mechanism.

7. In combination, a brake cylinder piston operative upon movement to effect an application of brakes, means movable by liquid to reduce the stroke of said piston required to apply the brakes, mechanism operative to force liquid to said means to effect the operation of said means, said piston being operative to effect the operation of said mechanism subsequent to an application of brakes in which the stroke of said piston exceeded a predetermined degree.

8. In combination, a brake cylinder piston operative upon movement to effect an application of brakes, mechanism operative by liquid under pressure to reduce the stroke of said piston required to effect an application of brakes, and pump means operative to force liquid under pressure to said mechanism to effect the operation thereof, said piston being operative to effect the operation of said pump means in effecting a release of brakes subsequent to an application in which the stroke of the piston exceeded a predetermined degree.

9. In combination, a brake cylinder piston operative upon movement to effect an application of brakes, slack adjuster means operative by liquid under pressure to reduce the stroke of said piston required to effect an application of brakes, mechanism adapted to be operated by said piston to pump liquid under pressure to said slack adjuster means to effect operation thereof, and means controlled by said piston and operative to condition said mechanism to pump liquid only in case said stroke of said piston exceeds a predetermined degree.

10. In combination, a brake cylinder piston adapted to be operated by fluid under pressure to effect an application of brakes, a slack adjuster piston through which said brake cylinder piston transmits force in effecting an application of brakes, and means for supplying liquid to said slack adjuster piston upon the release movement of said brake cylinder piston subsequent to a movement of said brake cylinder piston in applying the brakes in excess of a predetermined amount, to thereby vary the position of said slack adjuster piston relative to said brake cylinder piston.

11. In combination, a brake cylinder piston adapted to be operated by fluid under pressure to effect an application of brakes, means associated with said piston having an axial bore, a slack adjuster piston slidably mounted in said bore and through which said brake cylinder piston transmits force in effecting an application of the brakes, means for forcing liquid into said bore for effecting a predetermined movement of said adjuster piston relative to said brake cylinder piston for reducing the stroke of said brake cylinder piston required to effect an application of the brakes, said brake cylinder piston being operative to effect the operation of said means when the stroke thereof exceeds a predetermined degree in effecting an application of the brakes.

12. In combination, a brake cylinder piston adapted to be moved from a release position by fluid under pressure to effect an application of the brakes, a slack adjuster rod, means operative hydraulically for moving said rod relatively to said brake cylinder piston for reducing the stroke thereof required to effect an application of brakes, mechanism operative to pump liquid to effect the operation of said means, said brake cylinder piston being operative to effect the operation of said mechanism when the stroke thereof in effecting an application of brakes exceeds a predetermined degree.

13. In combination, a brake cylinder piston adapted to be moved from a release position by fluid under pressure to effect an application of the brakes, a slack adjuster rod, an element having screw-threaded engagement with said rod and operative upon rotation relative to said rod to move said rod relative to said piston for reducing the stroke thereof required to effect an application of the brakes, means operative by liquid under pressure for turning said element on said rod, and mechanism controlled by said piston operative to supply liquid under pressure to effect operation of said means when the stroke of said piston in effecting an application of brakes exceeds a predetermined degree.

14. In combination, a brake cylinder piston adapted to be moved from a release position by fluid under pressure to effect an application of the brakes, a slack adjuster rod, a rotor disposed in a chamber and having screw-threaded engagement with said rod and operative upon rotation relative to said rod to move said rod relative to said piston for reducing the stroke thereof required to effect an application of brakes, a plurality of spaced vanes slidably mounted radially in said rotor and urged into engagement with the wall of said chamber, means for supplying liquid under pressure to one side of said vanes for rotating said rotor on said rod, and means controlled by said piston for effecting operation of the liquid supply means when the stroke of said piston in effecting an application of brakes exceeds a predetermined degree.

15. In combination, a brake cylinder piston adapted to be moved by fluid under pressure to effect an application of brakes, slack adjuster means controlled by liquid under pressure for controlling the stroke of said piston required to effect an application of brakes, means operative if said stroke exceeds a predetermined degree to supply liquid under pressure to said slack adjuster means for effecting operation thereof to reduce said stroke, means for releasing the liquid from said slack adjuster means, and means operative manually when the liquid is released from said slack adjuster means for adjusting said slack adjuster means.

16. In combination, a brake cylinder piston adapted to be operated by fluid under pressure to effect an application of brakes, slack adjuster means having an initial adjustment and movable therefrom by liquid under pressure to reduce the stroke of said piston in effecting an application of brakes, a source of liquid, means operative if said stroke exceeds a predetermined degree to pump liquid from said source to said adjuster means for effecting operation thereof to reduce said stroke, valve means operative to prevent back flow of liquid pumped to said adjuster means, and means operative manually to open communication between said source and adjuster means for releasing liquid from said adjuster means whereby said adjuster means is adapted to be reset to its initial adjustment.

17. In combination, two pistons connected together through a liquid column, one of said pistons being a brake cylinder piston and the other a slack adjuster piston and the brake cylinder piston being adapted to be operated by fluid under pressure to transmit force through said column to said adjuster piston for effecting an application of the brakes, and a hydraulic pump adapted to be operated by said brake cylinder piston in case the stroke thereof in effecting an application of brakes exceeds a predetermined degree to pump liquid into said column for moving said slack adjuster piston away from said brake cylinder piston for thereby reducing the stroke of said brake cylinder piston required to effect application of the brakes.

18. In combination, two pistons connected together through a liquid column, one of said pistons being a brake cylinder piston and the other a slack adjuster piston and the brake cylinder piston being adapted to be operated by fluid under pressure to transmit force through said column to said adjuster piston for effecting an application of the brakes, and a hydraulic pump adapted to be operated by said brake cylinder piston in case the stroke thereof in effecting an application of brakes exceeds a predetermined degree to pump liquid into said column for moving said slack adjuster piston away from said brake cylinder piston for thereby reducing the stroke of said brake cylinder piston required to effect application of the brakes, and manually operative means for releasing liquid from said column for effecting movement of said adjuster piston toward said brake cylinder piston.

19. In combination, a brake cylinder piston adapted to be operated by fluid under pressure to effect an application of the brakes, a slack adjuster element having an initial adjustment and movable therefrom to reduce the stroke of said piston required to effect an application of brakes, rotary means operative by liquid under pressure to effect movement of said element to reduce said stroke, means operative by said brake cylinder piston when the stroke thereof exceeds a predetermined degree to supply liquid under pressure to effect operation of said rotary means, and manually operative means for releasing liquid from said rotary means to permit adjustment of said adjuster element to its initial adjustment.

20. In combination, a brake cylinder device comprising a casing, a piston slidably mounted in said casing and adapted to be moved by fluid under pressure to effect an application of brakes, slack adjuster means operative by lubricant to reduce the stroke of said piston required to effect an application of brakes, and means operative by said piston to force lubricant to the moving parts of said brake cylinder device for effecting lubrication thereof and to said slack adjuster means for effecting operation thereof.

21. In combination, a brake cylinder device comprising a casing, a piston slidably mounted in said casing and adapted to be moved by fluid under pressure to effect an application of brakes, slack adjuster means operative by lubricant to reduce the stroke of said piston required to effect an application of brakes, and means operative by said piston to force lubricant to a communication leading to the moving parts of said brake cylinder device for effecting lubrication thereof and also leading to said slack adjuster means for effecting operation thereof, and means for preventing flow of lubricant from said slack adjuster means back to said communication.

22. In combination, a brake cylinder device comprising a casing, a piston slidably mounted in said casing and adapted to be moved by fluid under pressure to effect an application of brakes, slack adjuster means operative by lubricant to reduce the stroke of said piston required to effect an application of brakes, and means operative by said piston to force lubricant to a communication leading to the moving parts of said brake cylinder device for effecting lubrication thereof and also leading to said slack adjuster means for effecting operation thereof, valve means for preventing flow of lubricant from said slack adjuster means back to said communication, and means operative manually to release lubricant from said slack adjuster means.

23. In combination, a brake cylinder device comprising a casing having a reservoir carrying a quantity of lubricant, a brake cylinder piston slidably mounted in said casing and adapted to be moved by fluid under pressure to effect an application of brakes, slack adjuster means adapted to be operated by lubricant to reduce the stroke of said piston required to effect an application of brakes, means operative to effect the supply of lubricant from said reservoir to a chamber and to force lubricant from said chamber through a communication to the moving parts of said device for effecting lubrication thereof and from said communication to said slack adjuster means for effecting operation thereof, said brake cylinder piston being adapted to effect the operation of the lubricant supply means when the stroke of said piston in effecting an application of brakes exceeds a predetermined degree, means for preventing flow of lubricant from said slack adjuster means back to said communication, and manually operative means for releasing lubricant from said slack adjuster means to said reservoir.

24. In communication, a brake cylinder device comprising a casing, a piston slidably mounted in said casing and adapted to be moved by fluid under pressure to effect an application of brakes, slack adjuster means operative by lubricant to reduce the stroke of said piston required to effect an application of brakes, means operative by said piston to force lubricant to the moving parts of said brake cylinder device for effecting lubrication thereof and to said slack adjuster means for effecting operation thereof, and means for preventing the supply of lubricant to said slack adjuster means until a predetermined pressure is developed on the lubricant forced to the moving parts of the brake cylinder device.

25. In combination, a brake cylinder piston movable by compressed air to effect an application of brakes, means movable by liquid to reduce the stroke of said piston required to apply the brakes, mechanism operative to force liquid to said means to effect the operation of said means, and means operative when the stroke of said piston exceeds a predetermined degree in effecting an application of the brakes to effect the operation of said mechanism.

BURTON S. AIKMAN.